(12) United States Patent
Zidan et al.

(10) Patent No.: US 9,738,827 B1
(45) Date of Patent: Aug. 22, 2017

(54) CARBON QUANTUM DOTS AND A METHOD OF MAKING THE SAME

(71) Applicant: Savannah River Nuclear Solutions, LLC, Aiken, SC (US)

(72) Inventors: Ragaiy Zidan, Aiken, SC (US); Joseph A. Teprovich, Aiken, SC (US); Aaron L. Washington, Aiken, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 0 days.

(21) Appl. No.: 15/141,415

(22) Filed: Apr. 28, 2016

(51) Int. Cl.
*C08K 3/38* (2006.01)
*C09K 11/65* (2006.01)
*C01B 31/02* (2006.01)

(52) U.S. Cl.
CPC .......... *C09K 11/65* (2013.01); *C01B 31/0206* (2013.01); *C08K 3/38* (2013.01); *C01P 2006/60* (2013.01)

(58) Field of Classification Search
CPC ....... C09K 11/65; C08K 3/38; C01P 2006/60; C01B 31/0206
USPC ........................................................ 524/404
See application file for complete search history.

(56) References Cited

U.S. PATENT DOCUMENTS

| | | | |
|---|---|---|---|
| 2012/0187373 A1 | 7/2012 | Xu et al. | |
| 2014/0225063 A1 | 8/2014 | Klem et al. | |
| 2014/0356732 A1* | 12/2014 | Zidan | H01M 10/0562 429/322 |
| 2015/0361334 A1* | 12/2015 | Kwon | H01L 51/0045 252/301.16 |

FOREIGN PATENT DOCUMENTS

| | | |
|---|---|---|
| CN | 103213969 | 7/2013 |
| CN | 103523772 | 1/2014 |
| EP | 2883835 | 6/2015 |
| JP | 11266007 | 9/1999 |
| WO | WO2014023097 | 2/2014 |
| WO | WO2016053411 | * 4/2016 |

OTHER PUBLICATIONS

Stasheuski, et al., "Photophysical Properties and Singlet Oxygen Generation Efficiencies of Water-Soluble Fullerene Nanoparticles", Photochemistry and Photobiology, 2014, 90: 997-1003.
Kumar, et al., "Au@poly(acrylic acid) plasmons and $C_{60}$ improve the light harvesting capability of a $TiO_2$/CdS/CdSe photoanode", Journal of Materials Chemistry A, 2014, 2, 9771-9783.
Aerben, et al., "Functionalized fullerene ($C_{60}$) as a potential nanomediator in the fabrication of highly sensitive biosensors", Biosensors and Bioelectronics 63 (2015) 354-364.
Zhang, et al., "Toward highly efficient CdS/CdSe quantum dot sensitized solar cells incorporating a fullerene hybrid-nanostructure counter electrode on transparent conductive substrates", RSC Advances, 2015, 5, 30617-30623.
Lu, et al., "An electrogenerated chemiluminescence sensor based on gold nanoparticles@$C_{60}$ hybrid for the determination of phenolic compounds", Biosensors and Bioelectronics 60 (2014) 325-331.
Sarkar, et al., "Understanding the electronic structure of CdSe quantum dot-fullerene ($C_{60}$) hybrid nanostructure for photovoltaic applications", Journal of Applied Physics 116, 114303 (2014), 8 pages.
Sarkar, et al., "Electronic structure and bandgap engineering of CdTe nanotubes and designing the CdTe nanotube-fullerene hybrid nanostructures for photovoltaic applications", RSC Advances, 2014, 4, 14673-14683.
Nandwana, et al., "Engineering the Nanoscale Morphology of a Quantum Dot-Fullerene Assembly via Complementary Hydrogen Bonding Interactions", Lanumuir, Mar. 2013, 29, 7534-7537.
David F. Eaton, "Reference Materials for Fluorescence Measurement", Pure and Applied Chemistry, vol. 60, No. 7, 1988 pp. 1107-1114.

* cited by examiner

*Primary Examiner* — Hui Chin
(74) *Attorney, Agent, or Firm* — Dority & Manning, P.A.

(57) ABSTRACT

The present invention is directed to a method of preparing a carbon quantum dot. The carbon quantum dot can be prepared from a carbon precursor, such as a fullerene, and a complex metal hydride. The present invention also discloses a carbon quantum dot made by reacting a carbon precursor with a complex metal hydride and a polymer containing a carbon quantum dot made by reacting a carbon precursor with a complex metal hydride.

23 Claims, 3 Drawing Sheets

CARBON QUANTUM DOTS AND A METHOD OF MAKING THE SAME

FEDERAL RESEARCH STATEMENT

This invention was made with Government support under Contract No. DE-AC09-085R22470, awarded by the U.S. Department of Energy. The Government has certain rights in the invention.

BACKGROUND OF THE INVENTION

Carbon quantum dots have become widely researched due to their low toxicity and good biocompatibility. In addition, carbon quantum dots also possess other desired characteristics such as an adjustable light-emitting range and good photo stability. These carbon quantum dots have been prepared and studied for various applications, including optoelectronics and biomedicine, and have many other potential applications. However, certain methods of preparation are quite expensive and yield carbon quantum dots with undesirable properties. For instance, some of these carbon quantum dots may exhibit a short emission wavelength (e.g., <450 nm), a low photoelectric conversion efficiency, etc.

As a result, there is a need to provide an improved method of preparing carbon quantum dots. In particular, there is a need to provide a method of preparing carbon quantum dots that allows for the ability to control or tune the properties, such as the photophysical, electronic, and/or quantum confinement properties.

SUMMARY OF THE INVENTION

Aspects and advantages of the invention will be set forth in part in the following description, or may be apparent from the description, or may be learned through practice of the invention.

In accordance with one embodiment of the present invention, a method for producing a carbon quantum dot is disclosed. The method comprises a step of reacting a carbon precursor with a complex metal hydride.

In accordance with another embodiment of the present invention, a carbon quantum dot is disclosed. The carbon quantum dot is made by reacting a carbon precursor with a complex metal hydride.

In accordance with another embodiment of the present invention, a polymer containing the carbon quantum dot is disclosed. The carbon quantum dot is made by reacting a carbon precursor with a complex metal hydride.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1A:
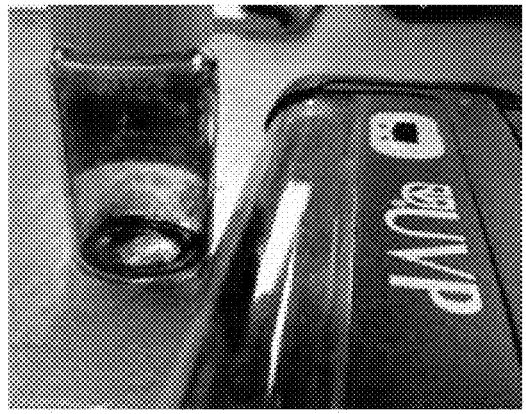
FIGS. 1a-1d provide fluorescence images of the carbon quantum dots.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally speaking, the present invention is directed to a method of preparing a carbon quantum dot. The carbon quantum dot can be prepared from a carbon precursor, such as a fullerene. The carbon precursor can be reacted with a complex metal hydride to form the carbon quantum dot. In addition, the present invention also discloses a carbon quantum dot made by reacting a carbon precursor with a complex metal hydride. In addition, the present invention also discloses a polymer containing a carbon quantum dot that is made by reacting a carbon precursor with a complex metal hydride.

In general, a quantum dot is a material in which excitons are confined in all three spatial dimensions. Such quantum dots are generally distinguishable from quantum wires and quantum wells. By controlling and/or modifying the size, the chemical modifications, etc. of the carbon quantum dot, various properties (e.g., optical, chemical, electrical, etc.) can be controlled.

In general, a carbon quantum dot is a quantum dot having carbon as the primary component. For instance, carbon atoms have the most weight or number of the components of the quantum dot. For instance, the content of carbon atoms in the carbon quantum dots is 50 weight % or more, such as 60 weight % or more, such as 70 weight % or more, such as 80 weight % or more, such as 90 weight % or more, such as 95 weight % or more and about 100 weight % or less.

In general, a carbon quantum dot may be characterized as a particle, the shape of which may be spherical, cylindrical, ellipsoidal, or other shape. The size or average size of the carbon quantum dot may refer to a dimension characteristic of its shape or an approximation of its shape. For instance, the size may refer to a diameter, a major axis, a predominant length, etc. In general, a carbon quantum dot is on the order of nanometers. In addition, the carbon quantum dots may be aggregates of carbon. The aggregates may be covalently or ionically bound.

The carbon quantum dots (or aggregates) may have a size of about 1 nm or greater, such as about 2 nm or greater and about 1000 nm or less, such as about 500 nm or less, such as about 250 nm or less, such as about 150 nm or less, such as about 100 nm or less, such as about 50 nm or less, such as about 20 nm or less, such as about 15 nm or less, such as about 10 nm or less.

According to the present invention, the carbon quantum dot is prepared by reacting a carbon precursor with a complex metal hydride. The carbon precursor and the complex metal hydride can be present at a weight ratio of 1:10 or more, such as 1:5 or more, such as 1:4 or more, such as 1:3 or more, such as 1:2 or more, such as 2:3 or more, such as 3:4 or more, such as 4:5 or more, such as 5:6 or more to about 10:1 or less, such as about 5:1 or less, such as about 4:1 or less, such as about 3:1 or less, such as about 2:1 or less, such as about 3:2 or less, such as about 4:3 or less, such as about 5:4 or less, such as about 6:5 or less.

To produce the carbon quantum dots, a carbon precursor is employed. The carbon precursor can be a carbon nanotube, a graphene, a fullerene, a graphite, or a combination thereof. For instance, in one embodiment, more than one type of carbon precursor may be employed to form the carbon quantum dots.

In one embodiment, the carbon precursor may consist essentially or consists of carbon atoms. For instance, the carbon precursor may contain at least 90 wt. %, such as at least 95 wt. %, such as at least 96 wt. %, such as at least 97 wt. %, such as at least 98 wt. %, such as at least 99 wt. %, such as at least 99.5 wt. %, such as at least 99.9 wt. %, such as about 100 wt. % of carbon.

In one embodiment, the carbon precursor comprises a fullerene. In general, without intending to be limited by theory, a fullerene may be a form of carbon having a large spheroidal molecule including a hollow cage of atoms. Fullerenes may be in the form of tubes, ellipsoids, hollow spheres, or the like and can range from 20 to several hundreds of carbon atoms. For instance, the fullerene can have 20 or more, such as 30 or more, such as 40 or more, such as 50 or more, such as 55 or more, such as 60 or more to 500 or less, such as 400 or less, such as 300 or less, such as 250 or less, such as 200 or less, such as 150 or less, such as 150 or less, such as 100 or less, such as 90 or less, such as 80 or less, such as 75 or less, such as 70 or less, such as 65 or less carbon atoms. For instance, the fullerene may be a $C_{60}$, $C_{70}$, $C_{76}$, $C_{78}$, $C_{80}$, $C_{82}$, $C_{84}$, $C_{120}$, $C_{180}$, $C_{240}$, etc. type fullerene. While one type of fullerene may be employed, it should be understood that multiple types of fullerenes may also be employed according to the present invention. In one particular embodiment, the fullerene may be a $C_{60}$ fullerene.

Additionally, the fullerene may optionally be functionalized or chemically modified. Such functionalization and/or modification may improve or modify certain properties (e.g., solubility, dispersability, etc.) of the fullerene and resulting carbon quantum dot. For instance, in one embodiment, the fullerene may have between 1 and 32, such as between 1 and 16, such as between 1 and 10, such as between 1 and 8, such as between 1 and 5 functional groups selected from the group consisting of carboxyl, amino, and hydroxyl. Without intending to be limited by theory, employing functionality may allow for adjusting and/or controlling the band gap chemistry. However, in one embodiment, the fullerene may not contain any functional groups. For instance, the fullerene may consist of carbon atoms.

Additionally, fullerene may also refer to a fullerene derivative. For instance, the fullerene may have a ligand attached to the outer surface. In one embodiment, the fullerene may not be a fullerene derivative such that the fullerene does not contain a ligand on the outer surface. For instance, the fullerene may consist of carbon atoms.

Additionally, the fullerene may be an endohedral fullerene wherein a non-carbon atom or atomic cluster is enclosed in the carbon cage. In one embodiment, the fullerene may not be an endohedral fullerene. For instance, the fullerene may consist of carbon atoms.

To produce the carbon quantum dots, a complex metal hydride is employed. Without intending to be limited by theory, the complex metal hydride may serve a reducing agent and assist in the formation of carbon aggregates that may then be considered a carbon quantum dot.

In general, complex metal hydrides are those wherein the anion contains a hydride. For instance, the complex metal hydride may have the formula $M_xM'_yH_n$, wherein M is an alkali metal cation or cation complex, M' is a metal or metalloid, and x, y, and n represent the number of atoms and are each independently of one another 1 or greater. In one embodiment, M' may be a Group IIIA metal or metalloid. Examples of these complex metal hydrides include, but are not limited to, $LiAlH_4$, $NaAlH_4$, $KAlH_4$, $LiBH_4$, $NaBH_4$, $KBH_4$, $NaGaH_4$, $LiGaH_4$, $Mg(BH4)_2$, $Ca(BH_4)_2$, $LiNH_2$, $NH_3BH_3$, $Mg(NH_2)_2$, etc. In one particular embodiment, the complex metal hydride comprises $LiBH_4$.

The reaction between the carbon precursor and the complex metal hydride may be conducted in the presence of a solvent. The solvent may be any solvent in which the reaction between the carbon precursor and the complex metal hydride may proceed. In one embodiment, the solvent may comprise an organic solvent. The solvent may include at least one of tetrahydrofuran, benzene, ether, hexane, toluene, or the like.

In one embodiment, a surfactant may be employed in the reaction. The surfactant may be an ionic surfactant (e.g., anionic or cationic), a nonionic surfactant, a zwitterionic surfactant, or a combination thereof. It should be understood that any surfactant known in the art may be employed. For example, the surfactant may be a glycol, a sulfate, a sulfonate, a phosphate, a phosponate, an ethoxylate, etc. or a derivative thereof. Without intending to be limited by theory, the surfactant can be used for surface passivation. This may help with solvent dissolution, preventing aggregation, and quantum confinement of the electron for more visible fluorescence.

The reaction between the carbon precursor and the complex metal hydride may be conducted under inert conditions. For instance, the reaction may be conducted under nitrogen gas or a noble gas, such as argon gas. In addition, the reaction may be conducted in a glovebox, in a glovebag, or by using a Schlenk line. The reaction may be conducted in any device that may allow for inert conditions if desired.

The reaction can be conducted at a temperature of from about 0° C. to about 500° C., such as from about 25° C. to about 500° C. For instance, in on embodiment, the reaction may be conducted at ambient temperature at atmospheric pressure.

The reaction time between the carbon precursor and the complex metal hydride can be any time as desired for the production of the carbon quantum dots. For instance, the time can range from 5 minutes to even 24 hours.

After the desired time for reaction, the reaction solution can be collected and the solvent can then be separated from the carbon quantum dots. For instance, the solvent can be removed under vacuum. In addition, heat may also be employed to assist in solvent removal. However, it should be understood that the solvent and carbon quantum dots may be removed using other mechanisms, such as filtration, centrifugation, etc.

Upon removing the solvent, the resulting material may be a powder or power-like substance. In general, the powder or powder-like substance may be referred to as "crude" or "as prepared" carbon quantum dots.

In one embodiment, the power or powder-like substance containing the carbon quantum dots can then be annealed.

The carbon quantum dots can be annealed at a temperature of from about 50° C. to about 500° C., such as from about 100° C. to about 500° C., such as from about 200° C. to about 400° C. In one embodiment, the annealing temperature may be about 300° C. Annealing can be conducted from 1 minute to 24 hours, such as from 0.5 hours to 10 hours, such as from 0.5 hours to 5 hours. In one particular embodiment, the annealing can be conducted for about one hour.

In one embodiment, the annealing can be conducted under a hydrogen environment, such as by using hydrogen gas. The annealing can be conducted at an elevated temperature and pressure. For instance, the hydrogen pressure may be as high as 2500 psi, such as up to 2200 psi, such as up to 2000 psi, such as up to 1500 psi, such as up to 1000 psi, such as up to 500 psi.

Without intending to be limited by theory, it is believed that annealing in general, and in particular under a hydrogen environment, can be used to control the hydrogen to carbon ratio of the carbon quantum dots. However, it should be understood that other steps and techniques may also be employed to control the hydrogen to carbon ratio. For instance, the ratio can be controlled or adjusted by the weight ratio of the metal hydride to the carbon precursor during the initial reaction. In this regard, the hydrogens from the hydride may bond to a carbon of the carbon precursor.

Thus, in one embodiment, the method disclosed herein can be used to modify the carbon to hydrogen ratio. The hydrogen to carbon ratio of the "crude" or "as prepared" carbon quantum dots or the quantum dots after annealing, thus any of the carbon quantum dots produced herein, can be 1:200 or more, such as 1:100 or more, such as 1:75 or more, such as 1:60 or more to 3:1 or less, such as 2:1 or less, such as 1:1 or less, such as 1:2 or less, such as 1:4 or less, such as 1:10 or less, such as 1:25 or less, such as 1:50 or less.

The hydrogen to carbon ratio can be determined using any method generally known in the art. For instance, the ratio can be determined based on the amount of metal hydride initially employed and/or thermos-gravimetric analysis (TGA) and residual gas analysis (RGA). TGA can generally be used to determine the mass lost by a sample at elevated temperatures while RGA can generally measure the particle pressures of individual gases in a mixture.

However, it should be understood that the annealing may also be done in another environment without the presence of a hydrogen gas. In such instance, annealing may remove hydrogen from the surface of the carbon quantum dots which then may allow it to bond more easily with other functional groups, such as hydroxyl groups of water. As a result, if desired, this in turn may increase the solubility in water and create more surface passivation which can increase the electron quantum confinement. In addition, without intending to be limited by theory, the annealing may also cause the release of hydrogen from the complex metal hydride, if present, thereby leaving behind the metal or metalloid that is bound to such hydride.

The method disclosed herein can be used to introduce heteroatom defects into the carbon quantum dots. For instance, during annealing, defects may be introduced into the carbon quantum dots. Without intending to be limited by theory, the defects may enhance the photophysical properties, such as the fluorescent properties, of the carbon quantum dots, such as when exposed to oxygen and/or water. For instance, the defects can be reactive with the oxygen and/or water in the atmosphere. Thus, exposure of the annealed carbon quantum dots to the atmosphere, in particular oxygen, can result in a color change of the carbon quantum dots. The introduction of these defects may also cause the carbon quantum dots to become fluorescent and soluble in a variety of aprotic and/or protic solvents.

As indicated herein, the carbon quantum dots may have heteroatom defects. In this regard, the carbon quantum dot may include at least one heteroatom other than carbon. In one embodiment, the carbon quantum dot may include at least one heteroatom other than carbon and hydrogen. The degree of heteroatom defects can be adjusted based on the desired emission. In this regard, the carbon quantum dot may be a heteroatom doped carbon quantum dot. The heteroatom may be N, O, S, P, Si, Se, As, Ge, Gd, B, Sb, Te, etc. In one particular embodiment, the heteroatom defect may be N, O, S, P, or a combination thereof. In this regard, the present invention also provides a method for heteroatom doping of the carbon quantum dots as well as a heteroatom doped carbon quantum dot.

The degree of heteroatom defects can be determined using any method generally known in the art. For instance, such defects can be determined using methods such as energy-dispersive X-ray spectroscopy (EDX) or X-ray photoelectron spectroscopy (XPS).

In addition to the methods disclosed herein, the heteroatoms can be introduced by reacting or contacting the carbon quantum dots with a solvent and/or gas. For instance, a solvent or gas, such as $H_2O$, $NH_3$, $H_2S$, $SO_2$, etc. may be employed to introduce the defect. The reaction may be performed (for instance in a flask) by introducing the gas during an annealing step, such as the aforementioned annealing step. For instance, the sample can be annealed in the presence of the gas. Without intending to be limited by theory, the sample could react with the gas in a similar manner as oxygen and water in order to introduce a defect in the carbon structure. Without intending to be limited by theory, it is believed that such defect results in the fluorescence activity of the carbon quantum dots.

In addition, in one embodiment, the carbon quantum dots may be intercalated or encapsulated with a metal or metalloid. In this regard, the metal or metalloid can be bonded to the carbon of the carbon quantum dot or can be encapsulated by the carbon quantum dots. In general, the metal or metalloid may be provided by the complex metal hydride. For instance, the metal or metalloid may be a Group IA, Group IIA, or Group IIIA metal or metalloid. For instance, the metal or metalloid may include Li, Na, B, Al, Ca, Mg, etc. In one embodiment, a carbon-metal or carbon-metalloid bond may be formed. For instance, a carbon-boron, a carbon-lithium, etc. bond may be formed. In this regard, the present invention also provides a method for metal intercalation of the carbon quantum dots.

Without intending to be limited by theory, the present method may also allow for a reduction in the path length of the electrons through increased hybridization (hydrogenation) of the surface carbons and increasing the energy of the excitons.

The present inventors have discovered that the properties of the carbon quantum dots can be controlled or tuned by varying the parameters disclosed herein. For instance, by altering the carbon precursor, modifying the complex metal hydride, metal intercalation, heteroatom doping, and/or hydrogen ratios, the properties of the carbon quantum dots can be controlled or tailored for a specific application.

In one embodiment, the fluorescence activity of the carbon quantum dots can be utilized. For instance, a polymer can be doped with the carbon quantum dots. The polymer may include any general polymer known in the art. For instance, the polymer may be a polyester, a polyolefin (e.g., polyethylene, polypropylene), a polystyrene, a polyacrylate (e.g., PMMA, PBA), a polyamide, polyethylene oxide (PEO), etc.

The carbon quantum dots prepared according to the present invention can be employed for various applications. For instance, the carbon quantum dots can be used in the fields of biomedicine (e.g., nanomedicine, etc.), catalysis (e.g., photocatalysis, electrocatalysis, etc.), photoelectric devices, etc. In particular, the carbon quantum dots can be employed in transistors, solar cells, LEDs, diode lasers. The carbon quantum dots can also be used as agents for sensing and imaging (e.g., medical imaging, bioimaging, chemical sensing, biosensing, etc.) or as qubits in quantum computing. The carbon quantum dots can be used for displays (e.g., televisions, phones, etc.) or head-up displays, such as transparent head-up displays. In addition, the ability to control the bandgap can also provide potential applications as for solid-state lighting.

EXAMPLES

Example 1—Synthesis of a Carbon Quantum Dot from a C60 Fullerene

Carbon quantum dots were synthesized using a C60 fullerene. Initially, 0.7 grams of lithium borohydride ($LiBH_4$) was added to a flask under inert conditions. Then, 30 mL of THF (organic solvent) were added to the flask and stirred. Then, 0.3 grams of a $C_{60}$ fullerene was added to the flask and the contents were allowed to stir for at least 30 minutes. The weight ratio of the $LiBH_4$ to the $C_{60}$ fullerene was 7:3. The reaction occurred at ambient temperature and atmospheric pressure and was conducted in a glovebox. In the case of THF, the addition of the $C_{60}$ fullerene resulted in a homogeneous red-brown solution.

Thereafter, the solvent was removed under vacuum and heat. The temperature was greater than the boiling point of the solvent (i.e., THF in this example). In particular, the temperature was approximately 100° C. Intermittent grinding was also employed under an inert atmosphere to facilitate removal of the solvent.

After the solvent was removed, a powder containing the carbon quantum dot was annealed at 300° C. under an inert atmosphere (argon) for an hour. During annealing, hydrogen was released. The color of the powder changed from red-brown to black.

Example 2—Fluorescence of the Carbon Quantum Dots

Figure 1B:
Figure 1C:
Figure 1D:

The fluorescent properties of the carbon quantum dots were analyzed under ultraviolet light and visible light. In particular, the color change of the carbon quantum dots upon exposure to air was observed. FIG. 1a shows the carbon quantum dots after annealing at 300° C. for 1 hour in normal light while under argon. FIG. 1b the same carbon quantum dots of FIG. 1a under ultraviolet light. FIG. 1c shows the carbon quantum dots in normal light after annealing and exposure to oxygen/moisture in the air. FIG. 1d shows the same carbon quantum dots of FIG. 1c under ultraviolet light. As indicated by FIGS. 1a-1d, exposure to oxygen/moisture results in a color change of the carbon quantum dots from black to red/orange. Without intending to be limited by theory, it is believed that the resulting fluorescence is due to the introduction of the oxygen defects from the atmosphere.

Example 3—Emission Spectra of the Carbon Quantum Dots

The emission spectra of the carbon quantum dots after annealing, exposure to air, and dissolution in waster was analyzed. The emission spectra were obtained using an Agilent Technologies Cary 60 UV-Vis and Cary Eclipse Fluorescence Spectrophotometer.

Figure 2:
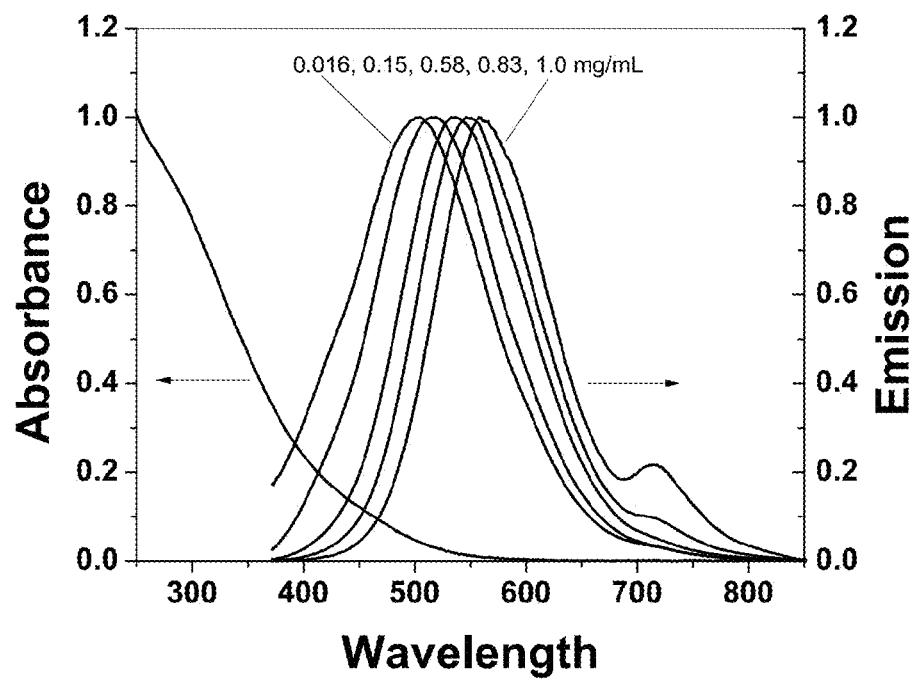
FIG. 2 is an emission spectrum as a function of the concentration of the carbon quantum dots.

FIG. 2 shows an emission spectrum as a function of concentration of the carbon quantum dots. The concentration in water ranged from 0.016 mg/mL to 1.0 mg/mL and all of the samples were excited at a wavelength of 350 nm. As shown in FIG. 2, as the concentration of the carbon quantum dots is increased, the emission maximum shifts to higher wavelengths. This could be due to the formation of larger aggregates of carbon quantum dots in solution.

At a concentration of 1.0 mg/mL and when excited at a wavelength of 350 nm, the carbon quantum dots may exhibit an emission maximum at a wavelength of from 400 to 700 nm, such as from 500 to 600 nm. At a concentration of from 0.01 to 1.0 mg/mL and when excited at a wavelength of 350 nm, the carbon quantum dots may exhibit an emission maximum at a wavelength of from 400 to 700 nm, such as from 450 to 600 nm.

Figure 3:
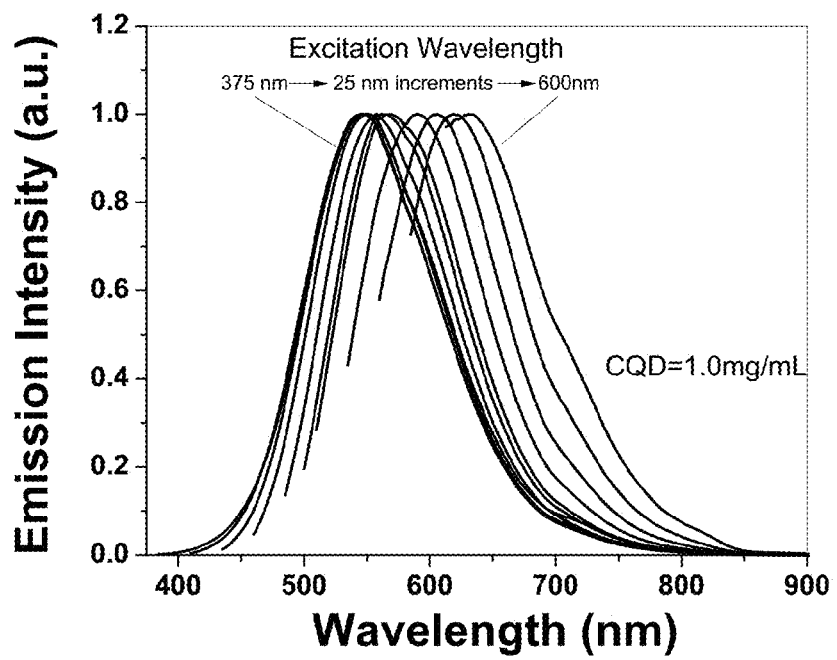
FIG. 3 is an emission spectrum as a function of the excitation wavelength.

FIG. 3 shows an emission spectrum as a function of excitation wavelength and a carbon quantum dot concentration in water of 1.0 mg/mL. As shown in FIG. 3, as the excitation wavelength is changed, the emission maximum also changes.

At a concentration of 1.0 mg/mL, the carbon quantum dots may exhibit an emission maximum of from 450 nm to 700 nm, such as from 500 nm to 675 nm, when using an excitation wavelength of from 375 nm to 600 nm.

Example 4—Embedding the Carbon Quantum Dots in PMMA

Figure 4:
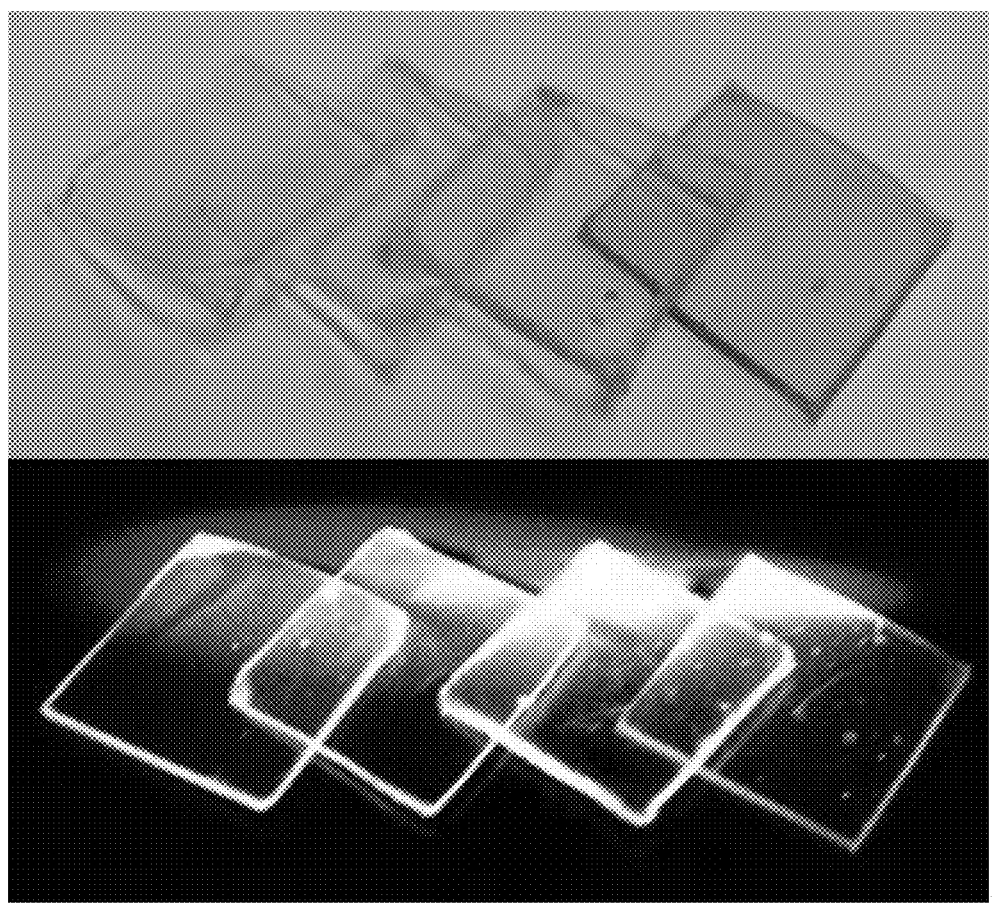
FIG. 4 provides images of poly(methyl methacrylate) doped with various concentrations of the carbon quantum dots.

The carbon quantum dots were embedded in poly(methyl methacrylate) slabs (20 mm×20 mm×1 mm) at various concentrations (e.g., from about 0.01 mg/mL to about 1 mg/mL). As shown in FIG. 4, as the concentration of the carbon quantum dots increases (left to right), the emission maximum also changes. The slabs at the top of FIG. 4 are shown under normal light while those at the bottom of FIG. 4 are shown under ultraviolet light.

Example 5—Measuring the Quantum Efficiency

The quantum efficiencies were determined using standardized efficiency tests that utilized quinine sulfate in sulfuric acid as a reference. The quantum efficiency is determined by comparing the fluorescence intensity of a sample with a standard of known quantum yield as described in Pure & Appl. Chem., Vol. 60, No. 7, pp. 1107-1114, 1988, which is incorporated herein by reference.

Extremely dilute solutions (e.g., <0.1 mg/mL) of standard (quinine sulfate in sulfuric acid) and test materials are measured for their absorbance maximum at 350 nm which is where the quantum efficiency of the standard is known to be 54%. Both solutions are maintained below 0.01 absorbance in an effort to reduce self-absorption that will lower the quantum efficiency. The solutions are then measured for their fluorescence intensity in a fluorimeter with the excitation wavelength set to 350 nm to only excite the population states in that energy regime.

The emission and absorption for both the sample and reference are used to calculate the relative efficiency. The efficiency (also referred to as yield) is the ratio of the number of photons emitted by the CQD divided by the number of photons absorbed by the CQD. The carbon quantum dots of the present disclosure exhibited quantum efficiencies of greater than 13% in water. This value is higher than reported in the literature from current carbon quantum dots (typically <5%).

The carbon quantum dots disclosed herein may exhibit a quantum efficiency of 1% or greater, such as 2% or greater, such as 5% or greater, such as 7% or greater, such as 10% or greater, such as 15% or greater, such as 25% or greater, such as 50% and or greater generally less than 100%, such as 80% or less, such as 70% or less, such as 50% or less, such as 30% or less, such as 15% or less, such as 10% or less, such as 5% or less.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A method for preparing carbon quantum dots, the method comprising:
    reacting a carbon precursor with a complex metal hydride, wherein the carbon precursor comprises a fullerene having 20 or more carbon atoms,
    wherein the carbon quantum dots have a size of about 1 nm or greater to about 1000 nm or less.
2. The method according to claim 1, wherein the fullerene has from 20 to 240 carbon atoms.
3. The method according to claim 2, wherein the fullerene has from 60 to 240 carbon atoms.
4. The method according to claim 1, wherein the fullerene comprises a $C_{60}$ fullerene.
5. The method according to claim 1, wherein the weight ratio of the carbon precursor to the complex metal hydride is from 1:10 to 10:1.
6. The method according to claim 1, wherein the complex metal hydride has the following formula $$M_xM'_yH_n$$

wherein
M is an alkali metal cation or cation complex,
M' is a metal or metalloid, and
x, y, and n are independently of one another, 1 or greater.
7. The method according to claim 6, wherein M is an alkali metal cation and M' is a Group IIIA metal or metalloid.
8. The method according to claim 6, wherein M is Li or Na and M' is Al or B.
9. The method according to claim 1, wherein the complex metal hydride comprises $LiAlH_4$, $NaAlH_4$, $KAlH_4$, $NaBH_4$, $KBH_4$, $NaGaH_4$, $LiGaH_4$, $Mg(BH_4)_2$, $Ca(BH_4)_2$, $LiNH_2$, $NH_3BH_3$, $Mg(NH_2)_2$.
10. The method according to claim 1, wherein the complex metal hydride comprises $LiBH_4$.
11. The method according to claim 1, wherein the reaction occurs under nitrogen gas.
12. The method according to claim 1, wherein the reaction occurs in the presence of an organic solvent.
13. The method according to claim 12, wherein the organic solvent comprises tetrahydrofuran or benzene.
14. The method according to claim 1, wherein the reaction occurs at a temperature of from about 25° C. to about 500° C.
15. The method according to claim 1, further comprising annealing the carbon quantum dots at a temperature of from about 100° C. to about 500° C.
16. The method according to claim 15, wherein the annealing is done in the presence of $H_2$, $H_2O$, $NH_3$, $H_2S$, or $SO_2$.
17. The method according to claim 1, wherein the carbon quantum dots have a hydrogen to carbon ratio of from 1:100 to 3:1.
18. The method according to claim 1, wherein the carbon quantum dots have at least one heteroatom.
19. The method according to claim 18, wherein the heteroatom comprises N, O, S, P, Si, Se, As, Ge, Gd, B, Sb, or Te.
20. The method according to claim 1, wherein the carbon quantum dots are intercalated with a metal or metalloid selected from Group IA, Group IIA, and Group IIIA.
21. The method according to claim 20, wherein the metal or metalloid comprises, Li, Na, B, Al, Ca, or Mg.
22. A carbon quantum dot made according to the method of claim 1.
23. A polymer comprising the carbon quantum dot of claim 22.

* * * * *